United States Patent
Strobel et al.

(10) Patent No.: US 11,838,143 B2
(45) Date of Patent: Dec. 5, 2023

(54) METHOD AND SYSTEM FOR PILOT TONE SYNCHRONIZATION IN POINT-TO-MULTIPOINT SYSTEMS

(71) Applicant: Intel Corporation, Santa Clara, CA (US)

(72) Inventors: Rainer Strobel, Munich (DE); Vladimir Oksman, Morganville, NJ (US)

(73) Assignee: Intel Corporation, Santa Clara, CA (US)

( * ) Notice: Subject to any disclaimer, the term of this patent is extended or adjusted under 35 U.S.C. 154(b) by 94 days.

(21) Appl. No.: 17/184,630

(22) Filed: Feb. 25, 2021

(65) Prior Publication Data

US 2021/0273820 A1 Sep. 2, 2021

Related U.S. Application Data

(60) Provisional application No. 62/982,776, filed on Feb. 28, 2020.

(51) Int. Cl.
H04L 7/00 (2006.01)
H04L 12/18 (2006.01)

(52) U.S. Cl.
CPC ........ *H04L 12/1863* (2013.01); *H04L 7/0008* (2013.01)

(58) Field of Classification Search
CPC .............. H04L 5/0051; H04L 12/1863; H04L 12/2861; H04L 5/003; H04L 7/0008; H04B 3/50
See application file for complete search history.

(56) References Cited

U.S. PATENT DOCUMENTS

| | | | |
|---|---|---|---|
| 2017/0180003 A1* | 6/2017 | Maes | H04M 11/062 |
| 2017/0222775 A1* | 8/2017 | Coomans | H04B 17/345 |
| 2021/0273820 A1* | 9/2021 | Strobel | H04L 5/0051 |
| 2021/0351950 A1* | 11/2021 | Oksman | H04L 47/72 |

FOREIGN PATENT DOCUMENTS

| | | | | |
|---|---|---|---|---|
| EP | 3700141 A1 * | 8/2020 | ............ | H04L 12/28 |
| EP | 3700141 A1 | 8/2020 | | |
| WO | 2019085406 | 5/2019 | | |

* cited by examiner

*Primary Examiner* — Jaison Joseph
(74) *Attorney, Agent, or Firm* — SPL Patent Attorneys PartG mbB; Yong Beom Hwang (57) ABSTRACT

An apparatus for pilot tone synchronization in point-to-multipoint (P2MP) communication is described, including a transceiver configured to send a downstream transmission including pilot tones to one or more customer premises equipments (CPEs) in a P2MP group. A method for pilot tone synchronization in point-to-multipoint (P2MP) communication is described, including sending a downstream transmission including pilot tones to one or more customer premises equipments (CPEs) in a P2MP group.

18 Claims, 3 Drawing Sheets

METHOD AND SYSTEM FOR PILOT TONE SYNCHRONIZATION IN POINT-TO-MULTIPOINT SYSTEMS

CROSS-REFERENCE TO RELATED APPLICATIONS

This application claims priority to U.S. Provisional Application 62/982,776, filed Feb. 28, 2020, the contents of which are incorporated by reference herein in their entirety.

FIELD

Examples relate to methods and systems for data transmission. Examples relate to tone synchronization in point-to-multipoint systems.

BACKGROUND

Data transmission can utilize synchronized components such as transceivers and receivers, such as in modems. Synchronizing a receiver to a pilot tone of a data signal may allow for data to be processed. For example, the received data may be unmanageable unless the timing of the beginning of frames of the data is successfully determined.

Point-to-multipoint communication may describe systems in which one communication unit can transmit to multiple other communication units. Point-to-multipoint P2MP systems may, for example, utilize pilot tones for synchronizing one or more receiving units to the signal(s) from the transmitting unit.

Maintaining synchronicity between upstream and downstream components can be technically challenging, particularly when noise can affect downstream components differently, such as in P2MP communications.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity. Figures may not be to scale.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
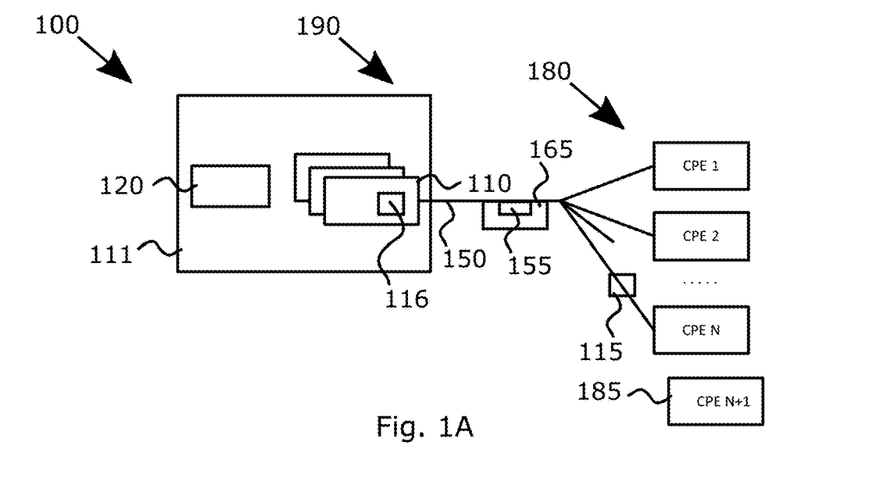
FIG. 1A illustrates an apparatus 100 for point-to-multipoint (P2MP) communication.

FIG. 1A illustrates an apparatus 100 for point-to-multipoint (P2MP) communication. The apparatus 100 includes a transceiver 110 which can send a downstream transmission 150 including pilot tones 155 to one or more customer premises equipments 180 (CPEs) in a P2MP group 190. The pilot tones 155 can take up part of an available bandwidth 150. The apparatus 100 can make use of an available frequency band 10 such as that shown in FIG. 1B. The available frequency band 10 can be used for communications between the apparatus 100 and the CPEs 180. The available frequency band 10 can be divided so as to allocate frequency bands within the available frequency band 10 for communication with respective CPEs 180.

Figure 1B:
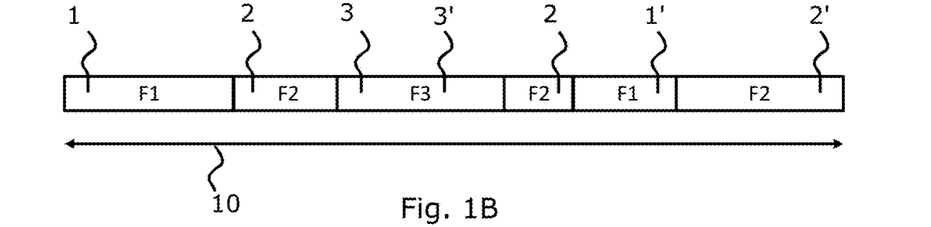
FIG. 1B illustrates frequency bands.

FIG. 1B illustrates frequency bands. The frequency bands F1, F2, F3, as shown in FIG. 1B, can be assigned respectively to CPE 1, CPE 2, and CPE 3. The frequency bands F1, F2, F3 assigned to the CPEs 180 may each be continuous, e.g. F3, or may be discontinuous, e.g. F1 and F2. The frequency bands F1, F2, F3 assigned to the CPEs 180 can be determined such that the available frequency band 10 includes the frequency bands F1, F2, F3 assigned to the CPEs 180; for example, the frequency bands F1, F2, F3 assigned to the CPEs 180 use up all the available frequency band 10. Using all the available frequency band 10 can aid in efficient data transmission. The frequency bands F1, F2, F3 assigned to the CPEs 180 can be used for upstream and/or downstream communication.

The pilot tones 155 can be selected by the CPE(s) 180. Pilot tones can be within respective frequency bands F1, F2, F3 assigned respectively to each CPE (CPE 1, CPE 2, CPE 3). Pilot tones 1, 1' can be within a first frequency band F1. Pilot tones 2, 2' can be within a second frequency band F2. Pilot tones 3, 3' can be within a third frequency band F3. The transceiver 110 can indicate pilot tones 155 selected by other CPEs 180 as being unavailable for selection by a joining (e.g. new) CPE 185 joining the P2MP group 190. The other CPEs can maintain the pilot tones 155 previously selected for each CPE 180 after the new CPE 185 joins the P2MP group 190.

The transceiver 110 can send a request to release one or more pilot tones 155 (e.g. a release request 115) to a CPE 180 and indicate the released pilot tone as available. The transceiver 110 can receive a request to grant additional pilot tone(s) (e.g. a grant request 116) from a CPE 180 (CPE 1, CPE 2, CPE 3) and assign an additional pilot tone to the CPE 180. The transceiver 110 can provide a grid of pilot tones (e.g. a predetermined grid of pilot tones) to CPEs 180. Alternatively/additionally, the pilot tones 155 can be selected by a CPE 180.

Figure 2:
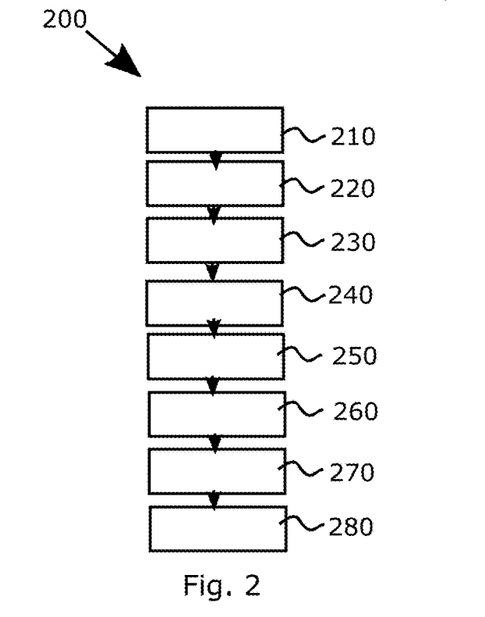
FIG. 2 shows a method of operation of an apparatus for operating pilot tones.

FIG. 2 illustrates a method 200 for pilot tone synchronization in point-to-multipoint (P2MP) communication. The method 200 includes sending 210 a downstream transmission 150 including pilot tones F1, F2, F3 to one or more customer premises equipments (CPEs) in a P2MP group. The pilot tones can be selected 220 by each CPE within a frequency band F1, F2, F3 (e.g. respective frequency bands F1, F2, F3) assigned to each CPE 180. The method can include indicating 230 pilot tones selected by other CPEs as unavailable to be selected by a new CPE joining the P2MP group. For example, an apparatus 100 can communicate to a new (e.g. joining) CPE the tones already in use, which may be unavailable for the new and/or joining CPE. The other CPEs can maintain 240 the pilot tones previously selected for each CPE after the new CPE joins the P2MP group.

The method can include sending 250 a request to release one or more pilot tones to a CPE. The method can include indicating 260 the released pilot tone as available. The method can include receiving 270 a request to grant an additional pilot tone from a CPE; and assigning 280 the additional pilot tone to the CPE.

Legacy digital subscriber line (DSL) systems, such as high-bit-rate digital subscriber line (HDSL), asymmetric digital subscriber line (ADSL), very high speed digital subscriber line (VDSL), and gigabit-rate DSLs, such as G.fast, can synchronize a remote modem at a customer premises (CP) to a head end modem (at the central office (CO), digital subscriber line access multiplexer (DSLAM), and/or distribution point (DP). Loop timing can be utilized, e.g. for synchronization.

With loop timing, a modem at the CP can extract and/or synchronize to the timing used by the head-end modem from the received signal. Pilot tones 155 in the signal 165 transmitted by the head end can simplify synchronization and/or timing extraction at the remote end (e.g. in the CPEs). Pilot tones can aid in enabling the accuracy of timing at the remote modem and/or reduce jitter. In multicarrier systems, pilot tones can be implemented by modulating one or more subcarriers with a fixed simple pattern. For example, a pilot tone may be a sinewave or a signal close to a sinewave.

MGFAST, which can have differences to previous generations of DSL equipment, can support point-to-multipoint (P2MP) topology. Multiple modems at CP(s) can be connected to a single head-end modem. The frequency band and/or bandwidth assigned to remote modems can be modified in response to the traffic demand from a particular application. Changing the frequency band used by any CP modem (such as in a CPE) may require adjustment of pilot tones, and possibly assigning and/or re-assigning pilot tones during showtime. It may also be desirable to minimize the number of pilot tones, such as to avoid performance losses.

Methods of pilot tone assignment, pilot tone management, managing synchronization, pilot tone transmission, and/or pilot tone synchronization, which can be used in DSL technology for example may be receiver-based. During initialization, for example, CPE and/or the receiver (e.g. of the modem at the CP) may select pilot tones 155, e.g. to support loop-timing synchronization. The receiver may indicate these pilot tones to the head-end modem, installed at the CO, in a street cabinet, or at a DP. The head-end modem transmits on the selected pilot tones a fixed shape signal (a sine wave for example) to provide the receiver at the CP with accurate frequency and phase for loop timing operation.

In an example, when a new joining customer premises equipment (CPE) picks its pilot tones, the joining CPE may not be aware of the how many tones picked by other CP modems and at what frequencies. Thus, as new tones are added, the total number of pilot tones may become too large. Many pilot tones may reduce the available remaining bandwidth for data transmission. Further, when a dynamic bandwidth redistribution (DBR) procedure takes place, the pilot tones used by a particular CPE and/or modem (e.g. a modem at a CP, such as a modem of a CPE) may become out of the frequency band used by the CPE and/or modem and within the band of another CPE and/or modem. In such a case, vectoring may no longer compensate crosstalk for the original CPE and/or modem, causing higher jitter in the recovered clock and associated performance loss.

MGFAST and other modalities can use vectoring. Many subcarriers within the spectrum may have poor signal-to-noise ratio (SNR), such due to crosstalk or high attenuation, such as if no noise cancellation procedure is done.

In vectored systems, like VDSL2 and G.fast for example, vectoring can be applied to pilot tones in the aim to avoid crosstalk from other lines, which tends to cause substantial jitter. With vectoring, the same pilot tone may not be used by more than one CPE of the P2MP group. The crosstalk channel between a disturbing line and each of P2MP CPEs may be different. Every CPE may use and/or select only pilot tones (e.g. from a grid of tones that are not occupied by other CPEs), which may increase the required total number of pilot tones (e.g. in the grid) to be chosen from.

Referring to FIG. 1A, in a point-to-multipoint (P2MP) scenario, for example, an apparatus 100 such as a DP transceiver (DPT) 110, which can be in the distribution point (DP) 111, is connected to multiple customer premises equipment (CPE 1, CPE 2, CPE 3, CPE N) transceivers. The system clock source (e.g. master clock) 120 can be in the DP 111 and feed one or multiple DPTs 110. Each of the CPEs can synchronize its clock source (which can be a slave-clock) with the master clock 110 at the DP 111, e.g. using loop timing, such as by extracting timing information from the received signal. FIG. 1A shows a point-to-multipoint connection between the DPT 110 and CPEs (CPE 1, CPE 2, CPE 3, CPE N).

To simplify loop timing, the DPT 110 can transmit pilot tones F1, F2, F3, which can be particular subcarriers modulated with a known simple fixed pattern, like a fixed constellation point corresponding to transmission of, for example, 0 or pseudorandom binary sequence (PRBS) signal or similar. Selection of subcarriers for pilot tones can be delegated to the CPE(s). For example, in a point-to-point (P2P) connection, when only one CPE is connected to the DPT, the CPE can select subcarriers with high SNR to be pilot tones. High SNR can a is in reducing jitter of the recovered CPE master clock 120.

In case of a P2MP connection, each CPE may be assigned a respective operation frequency band (or band, e.g. F1, F2, F3). The band may be for downstream and/or upstream communication. An example case of how the overall downstream operation frequency band can be shared by multiple CPEs (CPE 1, CPE 2, CPE 3 as in FIG. 1A) is presented in FIG. 1B. FIG. 1B shows an example of bands assigned for CPE 1, CPE 2, and CPE 3. The bands F1, F2, and F3 belong to CPE 1, CPE 2, and CPE 3, respectively. The assigned bands F1, F2, F3, can be nonoverlapping.

For example, the bands F1, F2, F3 assigned to the CPEs may change during showtime, seamlessly or almost seamlessly, using the Dynamic Bandwidth Redistribution (DBR). Bandwidth redistribution may accommodate new CPEs joining the P2MP group. Alternative/additionally, the frequency band F1, F2, F3 used by each CPE may sporadically require a change to address the traffic behavior between the network and the application connected to a particular CPE. For example a CPE may have an increase of the bandwidth when the user starts high definition TV (HDTV) instead of browsing internet with the CPE. DBR may be performed upon such changes.

Each of the CPEs in P2MP group may have at least one pilot tone. The number of CPEs can change during the system operation (some may join the network and some may drop off). Alternatively/additionally, the band F1, F2, F3 used by a CPE may change. Accordingly, disclosed herein are methods and apparatuses that address issues that may arise due to, for example, such dynamic changes of connectivity that can occur. Additionally issues may need to be addressed simultaneously, such as to maintain a low total number of assigned pilot tones. Examples herein allow for dynamic changes during operation while keeping bandwidth for data transfer high in order to maintain or increase the efficiency of the system.

The examples herein can also address issues associated with vectoring. In some scenarios, when a particular CPE uses a vectored pilot tone, crosstalk compensation for the vectored pilot tone may only be effective (e.g. in reducing noise and/or errors due to noise) for this CPE. The vectored pilot may not necessarily be effective for other CPEs connected to the same line. When another CPE desires to use the vectored pilot tone (generally, and/or after bandwidth redistribution for example), the DPT may change the vectoring setting. The vectoring setting may be changed to adjust crosstalk compensation and/or crosstalk cancellation for the new CPE. Alternatively/additionally, it is possible to generate a compromise vectoring solution, that serves for both CPEs, e.g. to modify the vectored pilot tone such that it is suitable for compensating or cancelling noise for both CPEs.

An example of a method of assignment of pilot tones follows:
1. Each CPE, when joining the P2MP group, picks a limited number of pilot tones within its assigned frequency band.
2. When a new CPE joins the P2MP group, the DPT blacks out for the new CPE (e.g. a joining CPE) all pilot tones used by other CPEs that joined the P2MP group earlier.
3. A joining CPE (e.g. the new CPE) may select a limited number of pilot tones e.g., minimum of 2 and up to 4, in the assigned frequency band.
4. A CPE (such as a CPE in showtime) may be forced by the DPT to release one or more pilot tones (e.g. to reduce the total number of pilot tones or to reduce to number of blackout tones for another CPE).
5. A CPE (e.g. in showtime) may request additional pilot tones, such as by requesting tones from the DPT. The request may be granted by additional pilot tones.

With reference to FIG. 1 for illustration, frequency bands F1, F2, F3 of respective CPEs 1, 2 . . . N can have a given band assignment and/or pilot tone assignment when another CPE (e.g. CPE N+1) is to join the P2MP group.

FIGS. 3A-3D illustrate examples of pilot tone assignment to CPEs, e.g. when new CPEs join and/or when DBR occurs. FIGS. 3A-3D may be understood as illustrating managing synchronization of a P2MP system, managing of pilot tones, managing of synchronization, managing of pilot tone assignment, managing pilot tone transmission, and/or managing pilot tone synchronization, for example.

Figure 3A:
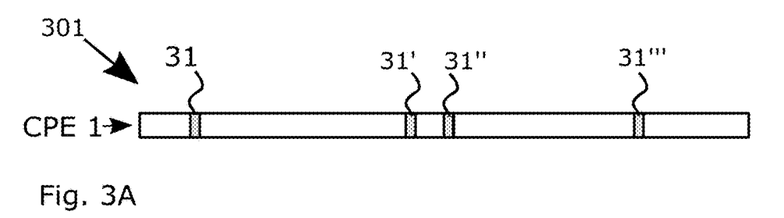
FIGS. 3A-3D illustrate examples of pilot tone assignment.

FIG. 3A illustrates a case in which CPE 1 is assigned the band 301. In the example of FIG. 3A, CPE 1 may be the only CPE joined. The entire available bandwidth may be assigned to CPE 1 in the example of FIG. 3A. Pilots 31, 31', 31", and 31''' are shown in the band 301. The pilots 31, 31', 31", and 31''' can be used to synchronize CPE 1 with an apparatus 100, such as a head-end modem, and/or master clock 120 thereof, for example. The pilots 31, 31', 31", and 31''' may be vectored, e.g. to reduce noise.

As illustrated in FIG. 3A, it is possible that only CPE 1 is assigned the available bandwidth and/or the entire available bandwidth is assigned to CPE 1.

Figure 3B:
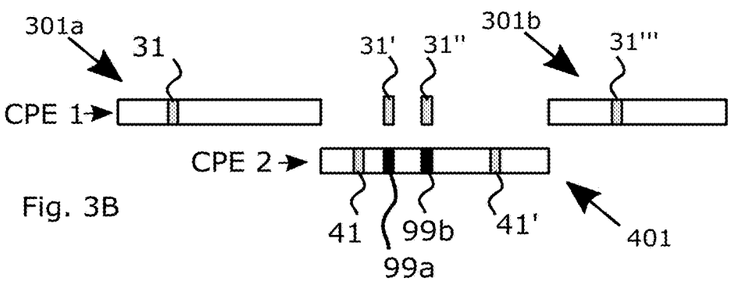

FIG. 3B illustrates a case in which CPE 2 has additionally joined. CPE 2 is assigned the second band 401. CPE 1 is assigned a firstly reassigned first band 301a, 301b, which may be part(s) of the band 301. The pilots 31' and 31", after the (re-)assignment of bands 401, 301a, 301b are outside of the firstly reassigned first band 301a, 301b assigned to CPE 1. Blackout tones 99a, 99b are also shown in FIG. 3B, e.g. where the pilots 31' and 31" for CPE 1 otherwise fall within the second band 401 assigned to CPE 2. Pilots 41, 41' were picked by CPE 2.

Figure 3C:
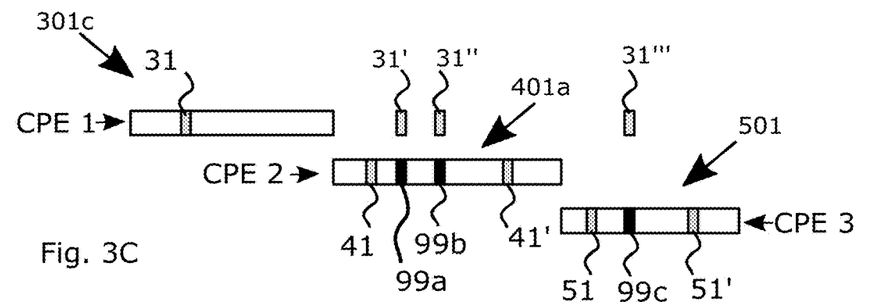

FIG. 3C illustrates a case in which CPE 3 has additionally joined. CPE 3 is assigned the third band 501. CPE 2 is assigned the firstly reassigned second band 401a (which is optionally different from second band 401 as previously assigned, see FIG. 3B). CPE 1 is assigned a secondly reassigned first band 301c (e.g. which may possibly be at least part of the firstly reassigned first band 301a). Any of the pilots for CPE 1 (e.g. pilots 31', 31", and 31'''), after the (re-)assignment of bands upon the joining of CPE 3, may be outside of the previously assigned band(s) 301 301a, 301b, 301c assigned to CPE 1 and/or the newly assigned band(s) 301c assigned to CPE 1. Blackout tones 99a, 99b, 99c are also shown in FIG. 3B, e.g. where the pilots 31', 31" and 31''' for CPE otherwise fall within any of the bands 401a, 501 assigned to CPE 2 and CPE 3. Pilots 51, 51' for CPE 3 are within the third band 501 assigned to CPE 3. Pilots 41, 41' for CPE 2 are within the firstly reassigned second band 401a assigned to CPE 2.

Figure 3D:
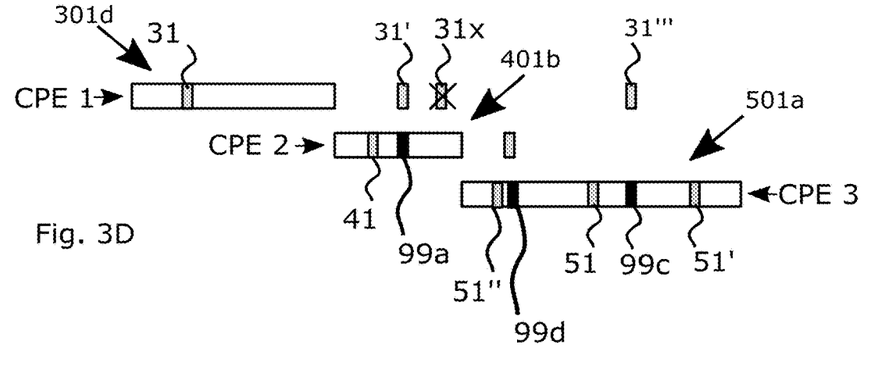

FIG. 3D illustrates a case in which a dynamic bandwidth redistribution (DBR) was performed. For example, after CPE 3 joins, as illustrated in Fig. C, a DBR occurs. FIG. 3D can illustrate the result after the DBR.

In the examples shown in FIGS. 3A-3D, the bandwidth assignments can be done in the way that the CPEs connected to the DPT occupy the entire bandwidth available for the DPT. For instance, if the available bandwidth is 424 MHz, as in MGFAST, and only one CPE is connected to the DPT, this entire bandwidth is used by this one CPE (e.g., CPE 1). When CPE 2 is joining, a DBR procedure divides the bandwidth, taking a part of the bandwidth from CPE 1 for CPE 2. For instance, 324 MHz for CPE 1 and 100 MHz for CPE 2 out of 424 MHz used by the DPT. When CPE 3 requests to join (FIG. 3C), another DBR is performed, sharing the overall 424 MHz band between CPE 1, CPE 2, and CPE 3. A rationale of this arrangement is to train each joining CPE with transmitting (TX) and receiving (RX)

signals that comprise the entire band. Otherwise, if a joining CPE will be trained with a signal that contains only a part of the frequency band, there may be difficulties in re-distributing bandwidth seamlessly, e.g. without re-training the analog front end of either the DPT, the CPE, or both. Furthermore, utilizing wider bandwidth and enabling higher bit rates when fewer CPEs are used is preferable for utilizing the entire system potential.

FIG. 3A shows the frequency band of the first joining CPE, CPE 1. CPE 1 picked four pilot tones 31, 31', 31", and 31'". FIG. 3B shows the frequency band after the second CPE, CPE 2, joins. The second CPE picked two pilot tones 41, 41' inside its assigned band 401. The subcarriers carrying pilot tones 31, 31' of CPE 1 are blacked out for CPE 2.

FIG. 3C shows the frequency band after the third CPE joins, CPE 3. CPE 3 picked two pilot tones 51, 51' inside its assigned band 501. The subcarriers carrying pilot tones 31, 31', 31", and 31'" of CPE 1 and/or CPE 2 are blacked out for CPE 3.

FIG. 3D shows the frequency band after a DBR that may occur after CPE 3 is joined. The DBR expands the band 501a of CPE 3, added an additional pilot tone 51", and cancelled a pilot tone 31x of CPE 1 to release more bandwidth in the band 401b, e.g. for more efficient use of the available bandwidth for data, e.g. in CPE 2. The subcarriers 99c, 99d carrying pilot tones of CPE 1 and CPE 2 are blacked out for CPE 3.

It is possible to add or remove pilot tones during a DBR procedure. During a DBR procedure, a request to modify pilot tones may be indicated to any of the CPEs participating in the procedure. The request to modify may be sent from the DPT to a CPE, as in the following example.

1. A DPT 110 can send a message to a particular CPE 180, indicating the blackout subcarriers 99 associated with out-of-band pilot tones used by other CPEs within the frequency band granted to the CPE. The message may alternatively/additionally indicate the out-of-band pilot tones that a CPE can release (e.g. to increase bandwidth for data transmission). See for example released pilot tone 31x of FIG. 3D.
2. In the response message, each of the CPEs involved in the DBR may indicate the new requested set of pilot tones. At least one of the requested set, such as all, may be inside the respectively newly granted band. The requested set is possibly limited to a limited number (e.g. one) of pilot tones per M subcarriers (e.g. to limit the density of pilot tones so as to utilize bandwidth more efficiently for data). The number M of subcarriers can be determined and/or suggested by the apparatus 100, for example. The requested set may respect a maximum number of pilot tones to be granted to each respective CPE. Alternatively/additionally, the respective maximum number can be the same for each CPE (e.g. four). The requested set, in some examples, is negotiated between the CPE and the DPT.
3. Upon execution of the DBR (e.g. at a particular symbol position), all CPEs may switch and/or rely on the updated set of pilot tones, e.g. within a data transmission.

In another example, a fixed grid of pilot tones may be used. A grid may provide an alternative/additional way to avoid the problems described herein.

Figure 4:
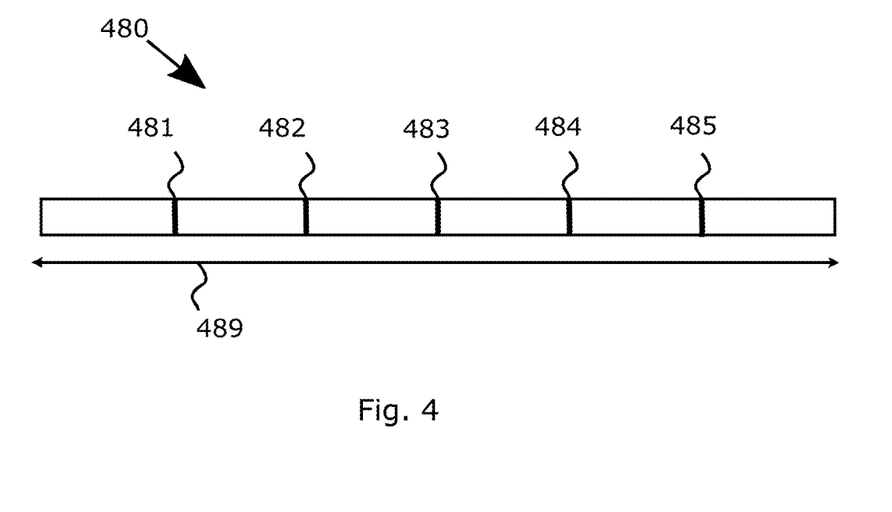
FIG. 4 illustrates a grid of pilot tones.

FIG. 4 illustrates a grid of pilot tones. For example, a grid 480 (which may be fixed) of pilot tones 481, 482, 483, 484, 485 is assigned, such that all joining CPEs and/or modems pick pilot tones 481, 482, 483, 484, 485 from the grid 480. The grid can be defined (e.g. in the specification) and/or created by the DPT at initialization. The pilot tones 481, 482, 483, 484, 485 in the grid 480 can be placed equidistantly over the available frequency band 489 which is available to the DPT (e.g. in case the grid is defined in the specification) and/or over the actual and/or available frequency band 489 used by the DPT.

When a CPE joins, the DPT can communicate assigned pilot tone(s) to the CPE. The CPE can pick a number of pilot tones from the grid inside its assigned operation band and/or available band. The number may be limited such as by the DFT. The CPE can inform the DPT which tones are selected. When the next CPE joins, the DPT can indicate to the next CPE all the pilot tones used by other CPEs, so the CPE can avoid them, if necessary (e.g., if DPT applies vectoring on a used pilot tone(s)). Alternatively/additionally, the DPT can indicate to the joining CPE all the pilot tones not used by other CPEs.

If a particular CPE does not find good pilot tones (e.g. pilot tones with sufficiently high signal:noise ratio (SNR)) within the assigned grid, the particular CPE may use pilot tones outside of the particular CPE's band. Alternatively/additionally, the particular CPE may request additional pilot tones. A DPT may be unable to estimate the quality and/or SNR at the CPE of pilot tones. The CPE may be in a better position to do so because, for example, the noise affects the reception at the CPE.

In another example, the grid 480 of pilot tones 481, 482, 483, 484, 485 can defined in the specification and thus known to the CPE beforehand.

In another example, the grid 480 of pilot tones 481, 482, 483, 484, 485 may be assigned by the first joining CPE. The first joining CPE can utilize the entire available band 489. The first joining CPE can possibly select a grid of pilot tones on strong subcarriers, with stable and/or high SNR. The high and/or stable SNR may benefit other later joining CPEs. The selected grid can be communicated to the DPT during initialization of the first joining CPE. Further, the DPT can communicates the grid to each later joining (e.g. additional) CPE. The DPT can indicate the pilot tones picked by any CPEs that have already joined. Each newly joining CPE can possibly pick a limited number of pilot tones within the assigned band to it. If there are not enough pilot tones within the assigned band and/or they are eventually not of a good quality (e.g. low and/or unstable SNR), the CPE can be allowed to pick pilot tones from the grid that are out of its assigned band. If the DPT uses vectoring on pilot tones, the CPE may be restricted to use only tones that are not yet utilized by other CPEs. In case vectoring is not used, multiple CPEs can use the same pilot tone. In some examples, CPEs can request additional pilot tones.

In another example, the grid 480 of pilot tones 481, 482, 483, 484, 485 may be set by the CPEs with no particular restrictions. Each joining CPE can select pilot tones, within or outside of its assigned band. The DPT can communicate all assigned pilot tones as proposed tones to be used to a joining (e.g. new) CPE. The joining CPE can check the proposed tones for SNR, those in-band or out-of-band, and if the joining CPE finds a good proposed tone(s) (e.g. one of high and/or stable SNR), the joining CPE can use the good proposed tone(s). If no good pilot tones among the proposed tone(s) are found, the CPE may ask for new proposed pilot tones, possibly within the assigned band of the joining CPE. In any case, a CPE may indicate what pilot tones the CPE uses. For example, the DPT may turn off (or keep off) some of the earlier assigned and/or proposed pilot tones. Doing so may avoid unnecessary overhead, and further re-use and/or allow use of these subcarriers for data transmission.

A computer program may have a program code for performing the methods as described herein. A machine-readable storage medium may include machine readable instructions, when executed, which implement the methods as described herein, and/or to realize an apparatus as described herein.

For example, a computer program can have a program code for performing at least one of any of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Herein are disclosed various methods, such as methods of managing synchronization of a P2MP system, methods of pilot tone transmission, and methods of pilot tone synchronization. The methods described herein can be carried out by apparatuses such as transceivers and receivers of a network, which may be working together to perform the methods described. The methods described herein can be carried out by apparatuses, such as distribution point apparatuses such as distribution point transceivers, and/or customer premise equipment such as or including receivers. Customer premise equipment may include receiver(s).

The examples disclosed herein can allow modems at the CP (e.g. CPEs) to stay with their selected pilot tones (at least with some tones, such as a majority of the selected pilot tones). Maintaining pilot tones may be possible regardless of bandwidth redistribution, e.g. dynamic bandwidth redistribution DBR. The examples herein may also allow adding new pilot tones and stop using old pilot tones. It is possible to reduce overhead due to pilot tones by limiting the number of pilot tones, e.g. by allowing reducing the number of pilot tones being used.

The examples herein may reduce overhead (e.g. due to minimizing the total number of pilot tones), increase synchronization stability (e.g, by reducing and/or cancelling crosstalk on pilot, e.g. with vectoring), and/or increase flexibility (e.g. by allowing modification of the number of joining and/or joined CPEs and their bandwidth, while optionally keeping the same set of pilot tones). These features may make the methods and apparatuses described herein more efficient and robust.

Herein, a good pilot tone may be a pilot tone with which the CPE can synchronize and/or lock onto. For example, the CPE can synchronize to the pilot tone. In some situations, the pilot tone may have picked up noise such that the CPE loses synchronicity with the pilot tone or cannot lock onto the pilot tone. Herein the term "pilot tone" and "pilot" may be used interchangeably.

Herein, a strong subcarrier may be a band of frequencies which have a high signal:noise ratio at the CPE. For example, a pilot tone at a strong subcarrier may synchronize more robustly a CPE.

Herein, vectoring can refer to noise-cancelling methods, such as those using an anti-noise signal superimposed on a carrier, or pilot tone, or the like.

Herein, dynamic bandwidth redistribution may be used interchangeably with dynamic bandwidth allocation.

Herein, a head-end or head-end modem can include a transceiver. For example, a head end can be an apparatus for pilot tone transmission and/or synchronization. Such an apparatus (e.g a head-end or head-end modem) can be for managing synchronization of a P2MP system, pilot tone management, managing synchronization, pilot tone assignment, pilot tone transmission, and/or pilot tone synchronization, for example.

Herein a CPE can be a modem or can include a modem. A CPE and/or modem thereof can be communicatively coupled to a head-end modem, apparatus, and/or transceiver such as a DPT, fore example.

Herein, point to multipoint communication can be a communication from one device to multiple devices. Alternatively/additionally, point to multipoint communication can be from one point to multiple points. Alternatively/additionally, point to multipoint communication can be a communication that goes from one location to multiple locations. Alternatively/additionally, point to multipoint communication can be from a one point, such as a central base station, to multiples nodes, users, subscriber units, end destinations, and/or CPEs.

The methods described herein can be for managing synchronization of a P2MP system, pilot tone management, managing synchronization, pilot tone assignment, pilot tone transmission, and/or pilot tone synchronization, for example.

The examples herein are disclosed to offer a way to possibly adjust pilot tones in P2MP scenarios that also allows changing the frequency band used by each of the connected CP modems, optionally while vectoring between each of the P2MP CP modems and all other CP modems is maintained.

The following enumerated examples are described herein. Aspects described in the following examples may be combined with examples described with respect to one or more of the figures above and vice versa.

Enumerated example 1 is an apparatus for pilot tone synchronization in point-to-multipoint (P2MP) communication, comprising a transceiver configured to send a downstream transmission including pilot tones to one or more customer premises equipments (CPEs) in a P2MP group.

Enumerated example 2 is the apparatus of enumerated example 1, wherein the pilot tones are selected by each CPE within a frequency band assigned to each CPE.

Enumerated example 3 is the apparatus of enumerated example 1 or 2, wherein the transceiver and/or apparatus is further configured to indicate pilot tones selected by other CPEs (such as indicating as unavailable) to be selected by a new CPE joining the P2MP group.

Enumerated example 4 is the apparatus of enumerated example 3, wherein the apparatus is configured such that the other CPEs maintain the pilot tones previously selected for each CPE after the new CPE joins the P2MP group.

Enumerated example 5 is the apparatus as in any one of enumerated examples 3-4, wherein the transceiver and/or apparatus is configured to send a request to release one or more pilot tones to a CPE and indicate the released pilot tone as available.

Enumerated example 6 is the apparatus as in any one of enumerated examples 1-5, wherein the transceiver and/or apparatus is configured to receive a request to grant an additional pilot tone from a CPE and assign the additional pilot tone to the CPE.

Enumerated example 7 is the apparatus as in any one of enumerated examples 1-6, wherein the transceiver and/or apparatus is configured to provide a predetermined grid of pilot tones to the CPEs.

Enumerated example 8 is the apparatus of enumerated example 7, wherein the predetermined grid of pilot tones is selected by a CPE.

Enumerated example 9 is a method for pilot tone synchronization in point-to-multipoint (P2MP) communication, comprising sending a downstream transmission including pilot tones to one or more customer premises equipments (CPEs) in a P2MP group.

Enumerated example 10 is the method of enumerated example 9, wherein the pilot tones are selected by each CPE within a frequency band assigned to each CPE.

Enumerated example 11 is the method of enumerated example 9 or 10, further comprising indicating pilot tones selected by other CPEs (such as indicating as unavailable) to be selected by a new CPE joining the P2MP group.

Enumerated example 12 is the method of enumerated example 11, wherein the other CPEs maintain the pilot tones previously selected for each CPE after the new CPE joins the P2MP group.

Enumerated example 13 is the method as in any one of enumerated examples 11-12, further comprising sending a request to release one or more pilot tones to a CPE; and indicating the released pilot tone as available.

Enumerated example 14 is the method as in any one of enumerated examples 9-13, further comprising receiving a request to grant additional pilot tone from a CPE; and assigning an addition pilot tone to the CPE.

Enumerated example 15 is a computer program having a program code for performing a method as in any one of enumerated examples 9-14.

Enumerated example 16 is a machine-readable storage medium including machine readable instructions which, when executed, implement a method or realize an apparatus as in any one of enumerated examples 1-14.

Enumerated example B1 is an apparatus for pilot tone transmission in point-to-multipoint (P2MP) communication, comprising a transceiver configured to send a downstream transmission including a variable plurality of pilot tones to a variable number of joined customer premises equipment (CPEs). The joined CPEs may be a subset of CPEs of a P2MP group. The apparatus may be configured such that each of the CPEs of the P2MP group has a state of being joined, joining, or unjoined to the transceiver. The transmitted pilot tones can be transmitted such that each joined CPE receives at least one pilot tone for synchronizing a clock of the CPE to a master clock.

Enumerated example B2 is the apparatus of Enumerated example B1, wherein the transceiver and/or apparatus is configured to assign each CPE a respective assigned frequency band which is variably assigned to each joined and a joining CPE when the joining CPE connects. The apparatus is configured to receive from the joining CPE a selection of a number of pilot tones for synchronization of the joining CPE.

Enumerated example B3 is the apparatus of Enumerated example B1 or B2, wherein the transceiver and/or apparatus is further configured to indicate, to a joining CPE, (such as indicating as unavailable) the pilot tones transmitted to the joined CPEs.

Enumerated example B4 is the apparatus of Enumerated example B3, wherein the apparatus is configured such that the pilot tones selected for each joined CPE are maintained when new pilot tones are sent to the joining CPE.

Enumerated example B5 is the apparatus as in any one of Enumerated examples B3-B4, wherein the transceiver and/or apparatus is configured to send a request to any of the joined CPEs to release one or more pilot tones and to indicate the one or more pilot tones as released.

Enumerated example B6 is the apparatus as in any one of Enumerated examples B1-B5, wherein the transceiver and/or apparatus is configured to receive a request for a requested pilot tone from a joined CPE and assign the requested pilot tone to the CPE.

Enumerated example B7 is the apparatus as in any one of Enumerated examples B1-B6, wherein the variable plurality of pilot tones is selected from a grid of pilot tones.

Enumerated example B8 is the apparatus of Enumerated example B7, wherein the grid of pilot tones is assigned by the CPE which is the first CPE to join.

Enumerated example B9 is a method for pilot tone transmission in point-to-multipoint (P2MP) communication, comprising sending a downstream transmission including a variable plurality of pilot tones to a variable number of joined customer premises equipment (CPEs). The joined CPEs may be a subset of a plurality of CPEs of a P2MP group. The apparatus may be configured such that each of the CPEs of the P2MP group has a state of being joined, joining, or unjoined to the transceiver and/or apparatus. The transmitted pilot tones can be transmitted such that each joined CPE receives at least one pilot tone for synchronizing a clock of the CPE to a master clock.

Enumerated example B10 is the method of Enumerated example B9, further comprising joining a joining CPE. Joining the joining CPE includes selecting at least one pilot tone for the joining CPE within a frequency band assigned to the joining CPE. The selecting is by the joining CPE.

Enumerated example B11 is the method of Enumerated example B9 or B10, further comprising blacking out frequency bands of pilot tones selected by other CPEs to a new CPE joining the P2MP group, such as the frequency bands of pilot tones within the assigned frequency band of the new CPE.

Enumerated example B12 is the method of Enumerated example B11, wherein the pilot tones previously selected for each CPE are maintained after the new CPE joins the P2MP group.

Enumerated example B13 is the method as in any one of Enumerated examples B11-B12, further comprising sending a request to release one or more pilot tones to a CPE; and indicating a released pilot tone as available.

Enumerated example B14 is the method as in any one of Enumerated examples B9-B13, further comprising receiving a request to grant an additional pilot tone from a CPE; and assigning the addition pilot tone to the CPE.

Enumerated example B15 is a computer program having a program code for performing a method as in any one of Enumerated examples B9-B14.

Enumerated example B16. A machine-readable storage including machine readable instructions, when executed, to implement a method or realize an apparatus as in any one of Enumerated examples B1-B14.

Enumerated example C1 is a method of P2MP controlling and/or managing synchronization, pilot tones, pilot tone assignment, pilot tone transmission, and/or pilot tone synchronization, comprising transmitting by a transceiver a transmission over an available frequency band to any subset of a plurality of customer premises equipments (CPEs) of a P2MP group downstream from the transceiver. When an integer number, N, of CPEs are joined, N being at least 1: the transmitting is to the N CPEs and includes N bands respectively allocated to the N CPEs, and the transmission includes an integer number, P, of pilot tones, such that the N CPEs are synchronized to a main clock; and when a $(N+1)^{th}$ CPE joins: reallocating the available frequency band to the first through $(N+1)^{th}$ CPEs, including allocating each of the first through $(N+1)^{th}$ CPE a respective first through $(N+1)^{th}$ portion of the available frequency band, and selecting, by the $(N+1)^{th}$ CPE, Q pilot tones in the $(N+1)^{th}$ portion, blacking out a subset of the P pilot tones, such as the subset that lies within the $(N+1)^{th}$ portion, for the $(N+1)^{th}$ CPE, requesting Q pilot tones for the $(N+1)^{th}$ CPE, and releasing up to Q pilot tones for the $(N+1)^{th}$ CPE in the $(N+1)^{th}$ portion of the available frequency band.

Enumerated example C2 is that of C1 wherein when a first CPE is the only joined CPE of the subset, the available frequency band is allocated to the first CPE, and the transmission includes P pilot tones (P=a positive integer such as 1 or 2 or more) for synchronizing the first CPE, and; when a second CPE joins and the first CPE is the only CPE already joined, the available frequency band is reallocated to the first and second CPEs, and the first CPE is allocated a first portion of the available frequency band and the second CPE is allocated a second portion of the available frequency band, the second CPE requests Q pilot tones in the second portion, and the transceiver blacks out for the second CPE a subset of the P pilot tones, such as those within the second portion, and the transmission includes up to Q pilot tones (Q=a positive integer) for synchronizing the second CPE.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. An apparatus for pilot tone synchronization in point-to-multipoint (P2MP) communication, comprising:
   a transceiver configured to send a downstream transmission including pilot tones to one or more customer premises equipments (CPEs) in a P2MP group,
   wherein the transceiver is further configured to indicate pilot tones selected by other CPEs as unavailable to be selected by a new CPE joining the P2MP group.

2. The apparatus of claim 1, wherein the apparatus is configured such that the other CPEs maintain the pilot tones previously selected for each CPE after the new CPE joins the P2MP group.

3. The apparatus as in claim 1, wherein the transceiver is configured to send a request to release one or more pilot tones to a CPE and indicate the released pilot tone as available.

4. The apparatus as in claim 1, wherein the transceiver is configured to receive a request to grant an additional pilot tone from a CPE and assign the additional pilot tone to the CPE.

5. The apparatus as in claim 1, wherein the transceiver is configured to provide a predetermined grid of pilot tones to the CPEs.

6. The apparatus of claim 1, wherein the pilot tones are selected by each CPE within a frequency band assigned to each CPE.

7. A method for pilot tone synchronization in point-to-multipoint (P2MP) communication, comprising:
   sending a downstream transmission including pilot tones to one or more customer premises equipments (CPEs) in a P2MP group; and indicating pilot tones selected by other CPEs as unavailable to be selected by a new CPE joining the P2MP group.

8. The method of claim 7, wherein the other CPEs maintain the pilot tones previously selected for each CPE after the new CPE joins the P2MP group.

9. The method as in claim 8, further comprising:
   sending a request to release one or more pilot tones to a CPE; and
   indicating the released pilot tone as available.

10. The method as in claim 9, further comprising:
    receiving a request to grant an additional pilot tone from a CPE; and
    assigning the additional pilot tone to the CPE.

11. The method of claim 7, wherein the pilot tones are selected by each CPE within a frequency band assigned to each CPE.

12. A non-transitory machine-readable storage medium including machine readable instructions which, when executed, implement the method of claim 7.

13. An apparatus for pilot tone transmission in point-to-multipoint (P2MP) communication, comprising:
    a transceiver configured to send a downstream transmission including a variable plurality of pilot tones to a variable number of joined customer premises equipment (CPEs),
    wherein the transceiver is further configured to indicate pilot tones selected by other CPEs as unavailable to be selected by a new CPE joining the P2MP group.

14. The apparatus of claim 13, wherein
    the apparatus is configured to assign each joined and joining CPE a respective assigned frequency band which is variably assigned to each CPE when a joining CPE connects, and
    the apparatus is configured to receive from the joining CPE a selection of a number of pilot tones for synchronization of the joining CPE.

15. The apparatus of claim 13, wherein
    the apparatus is further configured to indicate, to a joining CPE, the pilot tones that are transmitted to the joined CPEs.

16. The apparatus of claim 15, wherein
    the apparatus is configured such that the pilot tones selected for each joined CPE are maintained when a new pilot tone is sent to the joining CPE.

17. The apparatus of claim 16, wherein
    the apparatus is configured to send a request to any of the joined CPEs to release one or more pilot tones and to indicate the one or more pilot tones as released.

18. The apparatus of claim 13, wherein
    the apparatus is configured to receive a request for a requested pilot tone from a joined CPE and assign the requested pilot tone to the CPE.

* * * * *